(12) United States Patent
Proidl

(10) Patent No.: US 6,276,604 B1
(45) Date of Patent: Aug. 21, 2001

(54) DATA CARRIER DEVICE WITH TEST MEANS FOR TESTING THE ACCESS AUTHORIZATION OF A DATA READING DEVICE

(75) Inventor: Adolf Proidl, Vienna (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/372,458

(22) Filed: Aug. 11, 1999

(30) Foreign Application Priority Data

Aug. 17, 1998 (EP) .................................................. 98890237

(51) Int. Cl.[7] .................................................. G06K 5/00
(52) U.S. Cl. ............................................ 235/382; 235/492
(58) Field of Search ..................................... 235/379, 380, 235/382, 382.5, 492; 902/1, 5, 25, 26; 705/55

(56) References Cited

U.S. PATENT DOCUMENTS

| | | | |
|---|---|---|---|
| 4,449,040 | * 5/1984 | Matasuoka et al. | 235/380 |
| 4,839,506 | * 6/1989 | Homma et al. | 235/379 |
| 5,206,905 | * 4/1993 | Lee et al. | 705/55 |
| 5,594,227 | 1/1997 | Deo | 235/380 |

FOREIGN PATENT DOCUMENTS 2 274 184 * 7/1994 (GB).
11-259425 * 9/1999 (JP).

OTHER PUBLICATIONS

Technique for providing computer system security—by looking at both prior and present password to see if it was presented correctly or not., Mar. 25, 1990, abstract only of publication No. TP 39004 A, from Derwent database.*

* cited by examiner

Primary Examiner—Karl D. Frech
Assistant Examiner—Jared J. Fureman

(57) ABSTRACT

A data carrier device for outputting data stored in the data carrier device to at least one data reading device is provided with a data storage device for storing data and a fail count storage device for storing a fail count, a password information storage device for storing at least one password information item, and a test device for testing whether password information output to the data carrier device by a data reading device matches password information stored in the password information storage device, and for changing a fail count, stored in the fail count storage device in dependence on the test result. There is provided a random number generator for selecting a random number from a random number range, and the test device being arranged to fix, in case the tested password information does not match, a selected random number as the fail count.

8 Claims, 3 Drawing Sheets

DATA CARRIER DEVICE WITH TEST MEANS FOR TESTING THE ACCESS AUTHORIZATION OF A DATA READING DEVICE

BACKGROUND OF THE INVENTION

1. Field of the Invention

The invention relates to a data carrier device for outputting data stored in the data carrier device to at least one data reading device, which data carrier device includes data storage means for storing data and fail count storage means for storing a fail count, password information storage means for storing at least one password information item, and test means for testing whether password information output to the data carrier device by a data reading device matches password information stored in the password information storage means, and for changing a fail count, stored in the fail count storage means, in dependence on the test result, the data carrier device being capable of outputting data stored in the data storage means to at least one data reading device if, in case the tested password information matches, the fail count stored in the fail count storage means equals an access value.

2. Description of the Prior Art

A data carrier device of the kind set forth in the first paragraph is known from the document U.S. Pat. No. 5,594,227 A and is formed by a smart card. The smart card can be inserted into a smart card terminal which constitutes a data reading device and is arranged to read data stored in data storage means of the smart card and to display data read on a display screen of the smart card terminal.

The smart card includes test means for comparing password information, applied to the smart card terminal by a user, with password information stored in password information storage means of the smart card, and to output, in the case of matching of the tested password information, data stored in the data storage means of the smart card to the smart card terminal. The test means are arranged to change, in dependence on the test result, values contained in a fail count and a delay count.

A value of the fail count stored in fail count storage means then indicates how often a user has entered incorrect password information which does not match the password information stored in the smart card, the value "1" being subtracted from the stored value of the fail count upon each entry of correct password information matching the password information stored in the smart card.

A value of the delay count stored in delay count storage means indicates how long, after having entered incorrect password information, a user must wait before the user can enter password information again in the smart card terminal. When the value "1" is stored as the delay count, the user can enter password information again after expiration of a delay time amounting to two seconds subsequent to the detection of a mismatch of the tested password information by the test means. When the value "2" is stored as the delay count, further password information can be entered only after a delay time of four seconds whereas in the case of a value "3" password information can be entered again only after a delay time of eight seconds; in the case of a delay count equaling "16", further password information can be entered only after a delay time amounting to 18.2 hours.

When a user inserts the smart card into a smart card terminal and subsequently inputs password information into the smart card terminal, the value "0" is stored for the fail count as well as for the delay count. If the password information entered by the user does not match the password information stored in the smart card, the text "ACCESS DENIED" is displayed on the display screen of the smart card terminal and the value "1" is stored as the fail count and as the delay count.

In the case of further mismatching of the password information stored in the smart card and further password information, entered no sooner than after a delay time of two seconds, the text "ACCESS DENIED" is again displayed on the display screen of the smart card terminal and the value "2" is stored as the fail count and as the delay count.

In case the password information stored in the smart card subsequently matches further password information, entered no sooner than after a delay time amounting to four seconds, the text "ACCESS DENIED" is displayed once more on the display screen of the smart card and the value "1" is stored as the fail count and the value "3" as the delay number.

The smart card outputs the data stored in the data storage means of the smart card to the smart card terminal for display only if the test means establish the matching of the tested password information and if a value stored as the fail count equals an access value "0". In this case the text "ACCESS GRANTED" is displayed on the display screen of the smart card terminal and subsequently data selected by the user and stored in the data storage means of the smart card is displayed on the display screen of the smart card terminal.

However, it has been found that after attempted tampering with the known smart card, during which a user who is not authorized to use the smart card has attempted to achieve display of data stored in the data storage means of the smart card by entering a plurality of possible password information items, the delay times already become so long that the smart card is practically no longer suitable for use. A user who is authorized to use a smart card and knows the correct password information stored in the smart card must then enter the correct password information 16 times, until the access value "0" is stored as the fail count, after a tampering attempt during which, for example incorrect password information has been entered 16 times. After each entry of the correct password information, however, a delay time of 8.2 hours must be observed before the correct password information can be entered again, so that the data stored in the data storage means of the smart card can be displayed to the authorized user on the display screen of the smart card terminal no sooner than after 5.5 days.

SUMMARY OF THE INVENTION

It is an object of the invention to eliminate the described problems and to provide an improved data carrier device of the kind set forth in the first paragraph. In a data carrier device of the kind set forth in the first paragraph this object is achieved according to the invention in that there is provided a random number generator for selecting a random number from a random number range, and that the test means are arranged to fix a selected random number as the fail count in the case of mismatching of the tested password information. It is advantageous that a user who is not authorized to read data stored in data storage means of the data carrier device and attempts to tamper with the device does not know how often a possibly correct password information item must be successively entered into a data reading device in order to be granted access to the data stored in the data storage means of the data carrier device. On the other hand, a user who is authorized to use the data carrier device will enter the correct password information into a data reading device repeatedly until the test means grant access to the data stored in the data storage means. Tampering attempts are thus impeded and the use of a delay count and delay times between the entry of password information items can be dispensed with so that, after attempted tampering, the data stored in the data storage means of the data carrier device can be quickly displayed to an authorized user after repeated entry of the correct password.

It has been found that it is advantageous to take the steps described in Claim 2 for a data carrier device as claimed in Claim 1. This advantageously enables the random number range to be changed after repeated entry of incorrect password information, so that the random numbers selected by the random number generator have larger values and attempted tampering becomes more difficult.

It has been found that it is advantageous to take the steps disclosed in Claim 3 for a data carrier device as disclosed in Claim 1. This offers the advantage that the data carrier device is arranged to detect systematic tampering attempts and appropriate steps can be taken by the data carrier device so as to prevent these and further tampering attempts.

It has been found that the steps disclosed in Claim 4 are advantageously taken for a data carrier device as claimed in Claim 3. This offers the advantage that a systematic tampering attempt detected by the tampering detection means is interrupted and that, further input of password information so as to acquire data stored in the data storage means is enabled only after an inhibit period of, for example two hours.

It has been found that the steps disclosed in Claim 5 are advantageously taken for a data carrier device as claimed in Claim 4. This offers the advantage that a user who enters a data carrier device which has been subject to a tampering attempt briefly before that into a data reading device receives information that the data carrier device has been subject to a temperating attempt and also the time at which password information can be entered again in order to access data stored in the data storage means.

It has been found that the steps disclosed in Claim 6 are advantageously taken for a data carrier device as claimed in Claim 3. This offers the advantage that different password information items can be issued for a plurality of data reading devices. A data carrier device then outputs the data stored in its data storage means to a data reading device only if user identification information of the data reading device, received from the data reading device, and password information which is entered by a user of the relevant data reading device and received by the data carrier device are stored in associated form in the password information storage means.

It has been found that the steps disclosed in Claim 7 are advantageously taken for a data carrier device as claimed in Claim 1. This results in a smart card in which the data stored in the data storage means of the smart card is particularly effectively protected against attempted tampering.

It has been found that the steps disclosed in Claim 8 are advantageously taken for a data carrier device as claimed in Claim 1. This results in a computer which is formed, for example by a data base server which is connected to the Internet and wherein data stored in the data storage means of the computer is particularly effectively protected against attempted tampering.

The invention will be described in detail hereinafter on the basis of two embodiments which are shown in the drawings; however, the invention is by no means restricted thereto.

DETAILED DESCRIPTION OF THE PREFERRED EMBODIMENTS

Figure 1:
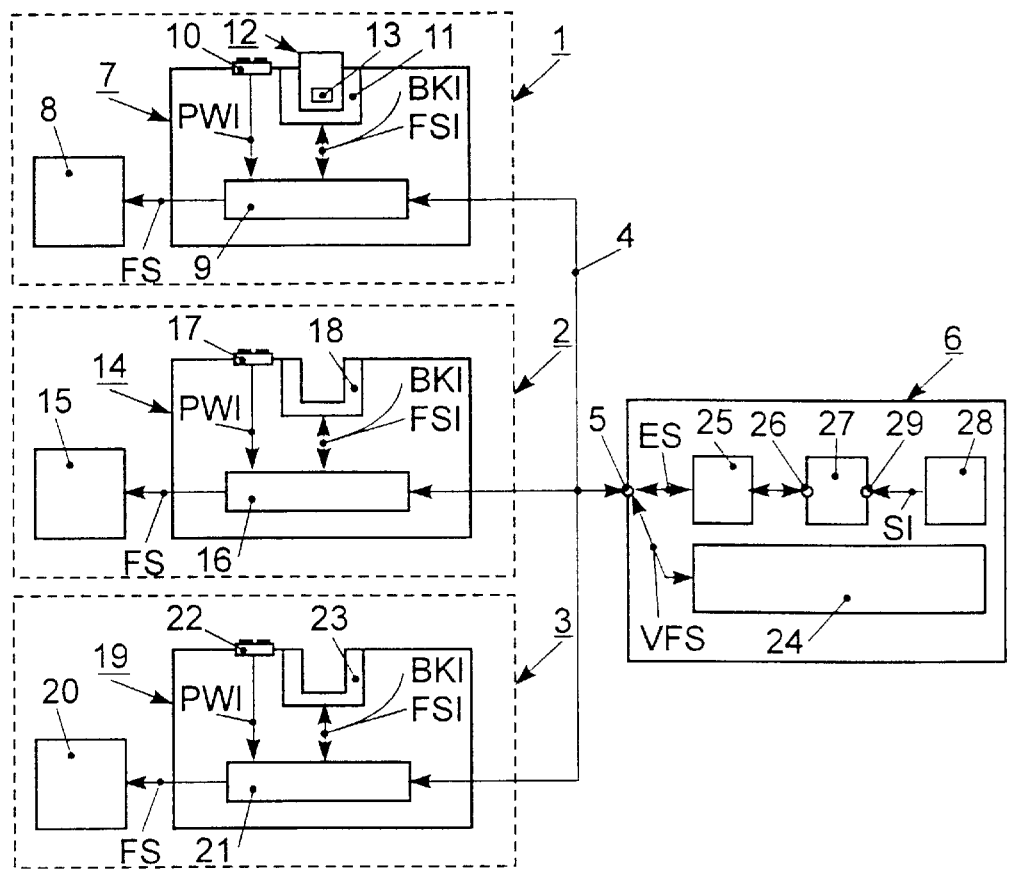
FIG. 1 shows a film dispensing device which constitutes a data carrier device which can output an encrypted television signal and key information to data reading devices which are connected to the film dispensing device via a cable network and each of which is formed by a set top box and a television set, a smart card being inserted into a set top box.

FIG. 1 shows a first data reading device 1, a second data reading device 2 and a third data reading device 3 which are connected, via a cable network 4, to a connection 5 of a film dispensing device 6 which constitutes a first embodiment of a data carrier device according to the invention. One of these data reading devices 1, 2 or 3 can apply user identification information BKI, characterizing the relevant data reading device 1, 2 or 3, together with password information PWI, entered by a user of the data reading device 1, 2 or 3, to the film dispensing device 6. When the user of the data reading device 1, 2 or 3 is authorized to watch an encrypted television signal VFS output by the film dispensing device 6, as is tested in the film dispensing device 6 by checking the password information PWI(BKI) in combination with the user identification information BKI from the data reading device 1, 2 or 3, the film dispensing device 6 is arranged to output key information SI, stored in the film dispensing device 6, to the data reading devices 1, 2 and 3. The data reading device 1, 2 or 3 of the authorized user is arranged to decrypt the encrypted television signal VFS by means of the received key information SI as will be described in detail hereinafter.

The data reading device 1 is formed by a set top box 7 and a television set 8 connected to the set top box 7. Processing means 9 of the set top box 7 are connected, via the cable network 4, to the connection 5 of the film dispensing device 6. The processing means 9 are arranged to decrypt, while using film key information FSI, an encrypted television signal VFS which is output by the film dispensing device 6 and to output a decrypted television signal FS to the television set 8.

The set top box 7 also includes a keyboard 10 which is connected to the processing means 9 and via which password information PWI can be entered by a user of the data reading device 1.

The set top box 7 also includes a smart card reading device 11 in which a smart card 12 can be inserted. The smart card reading device 11 is arranged (in a manner not shown in FIG. 1) to communicate with processing means 13 of the smart card 12 via contacts of the smart card 12. The processing means 13 of the smart card 12 store user identification information BKI which may be formed, for example by a serial number of the smart card. Each smart card that can be inserted into one of the data reading devices 1, 2 and 3 contains different user identification information BKI. The processing means 13 of the smart card 12 also store encrypted film key information which can be decrypted, by means of key information SI output by the film dispensing device 6, so as to be output to the smart card reading device 11 as film key information SI.

The smart card reading device 11 is connected to the processing means 9 of the set top box 7 and is arranged to output user identification information BKI, output to the smart card reading device 11 by the processing means 13 of the smart card 12, and film key information FSI to the processing means 9 of the set top box 7. The processing means 9 are arranged to output user identification information BKI, received from the smart card reading device 11, and password information PWI, received via the keyboard 10, as password information PWI(BKI), in association with the user identification information BKI, via the cable network 4, to the connection 5 of the film dispensing device 6.

The construction and operation of the data reading devices 2 and 3 correspond to the construction and operation of the data reading device 1, no smart card being inserted in the data reading devices 2 and 3. The data reading device 2 includes a set top box 14, a television set 15, a processing device 16, a keyboard 17 and a smart card reading device 18. The data reading device 13 includes a set top box 19, a television set 20, a processing device 21, a keyboard 22 and a smart card reading device 23.

The film dispensing device 6 also includes transmitter means 24 which are connected to the connection 5 and are arranged to output an encrypted television signal VFS via the connection 5. Films which are possibly of interest to users of the data reading devices 1, 2 and 3 are output by the transmitter means 24 in the form of an encrypted television signal VFS as is known, for example from the broadcast service "Premiere".

The film dispensing device 6 also includes processing means 25 which are connected to the connection 5 and are arranged to filter out password information PWI(BKI), applied to the connection 5 of the film dispensing device 6 by one of the data reading devices 1, 2 and 3, via the cable network 4, from an input signal ES of the film dispensing device 6, and to output filtered password information PWI (BKI) to a test connection 26 of test means 27. The test means 27 are arranged to test whether password information PWI(BKI), output to the film dispensing device 6 by one of the data reading devices 1, 2 and 3, matches password information GPWI(BKI) stored in the test means 27, as will be described in detail hereinafter with reference to the FIGS. 2 and 3.

The film dispensing device 6 also includes data storage means 28 which are connected to a data connection 29 of the test means 27. When a test in the test means 27 indicates that a user of one of the data reading devices 1, 2 and 3 is authorized to watch a film output by the transmitter means 24 in the form of an encrypted television signal VFS, appropriate key information SI, stored in the data storage means 28, can be read from the data storage means 28 by the test means 27 so as to be applied to the processing means 25 for output to the data reading devices 1, 2 and 3. Key information SI output to all data reading devices 1, 2 and 3 by the film dispensing device 6 is suitable for decrypting the encrypted film key information stored in the relevant smart card 12 only in association with the user identification information BKI of the smart card 12 of the authorized user, which is why a film can indeed be viewed only by means of the television set 8 of the data reading device I of the authorized user.

Figure 2:
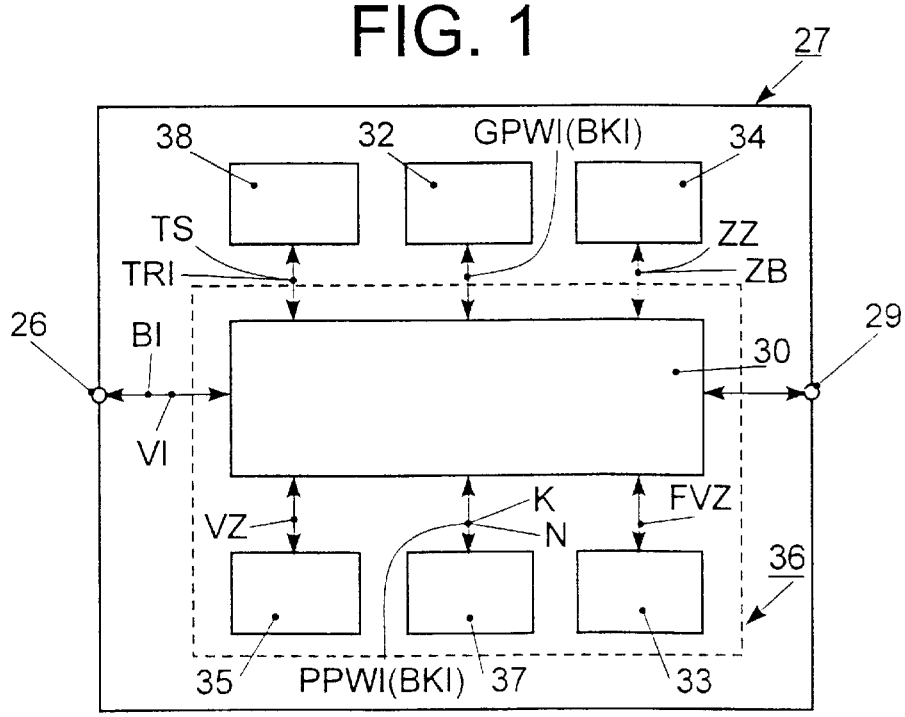
FIG. 2 shows test means provided in the data carrier device shown in FIG. 1.

The construction of the test means 27 will be described in detail hereinafter with reference to FIG. 2. The test means 27 include control means 30 which are connected to the test connection 26 and to the data connection 29 of the test means 27. The control means 30 execute a program run which is shown in the form of a flow chart in FIG. 3 and will be described in detail hereinafter with reference to FIG. 3.

The test means 27 also include password information storage means 32 which are connected to the control means 30 and can store at least one user identification information item BKI which characterizes a data reading device 1, 2 or 3 and is associated with password information PWI(BKI), as stored password information GPWI(BKI).

When a user of the data reading devices 1, 2 or 3 purchases the smart card 12 in order to be authorized to view films dispensed by the film dispensing device 6 for a given period of time, the user is issued password information PWI which may be formed by a combination of numbers, a combination of letters and numbers, or a combination of letters. This password information PWI(BKI) is stored, in association with the user identification information BKI of the smart card 12, as stored stored password information GPWI(BKI) in the password information memory 32. The password information storage means 32 contain stored password information items GPWI(BKI) for a plurality of users of data reading devices 1, 2 or 3.

The test means 27 also include fail count storage means 33 which are connected to the control means 30 and serve to store the value of a fail count FVZ. A value which is stored in the fail count storage means 33 as the fail count FVZ then indicates how often incorrect password information PWI (BKI), failing to match the password information GPWI (BKI) stored in the password information storage means 32 of the film dispensing device 6, has been entered by a user; for each entry of correct password information PWI(BKI), matching the password information GPWI(PKI) stored in the password information storage means 32, the value "1" is then subtracted from the current value of the fail count FVZ so as to be stored in the fail count storage means 33.

The control means 30 of the test means 27 are arranged to change the value of a fail count FVZ, stored in the fail count storage means 33, in dependence on the test result of the tested password information PWI(BKI) and GPWI(PKI). The film dispensing device 6 is arranged to output data, stored in the data storage means 28 and formed by key information SI, to at least one of the data reading devices 1, 2 or 3 when, in the case of matching of the tested password information PWI(BKI) and GPWI(BKI), the fail count FVZ stored in the fail count storage means 33 equals an access value as will be described in detail hereinafter with reference to the flow chart 31 shown in FIG. 3.

The test means 27 advantageously include a random number generator 34 which is connected to the control means 30 and is arranged to select a random number ZZ from one of two random number ranges ZB1 or ZB2. The test means 27 are arranged to fix, upon mismatching of the tested password information PWI(BKI) and GPWI(BKI), a selected random number ZZ as the fail count FVZ and to store the value of the fail count FVZ in the fail count storage means 33 as will be described in detail hereinafter with reference to the flow chart 31 shown in FIG. 3.

The test means 27 also include attempt count storage means 35 which are connected to the control means 30 and serve to store the value of an attempt count VZ. The control means 30 of the test means 27 are arranged to change, upon each test of password information PWI(BKI) output to the film dispensing device 6 by one of the data reading devices 1, 2 or 3, an attempt count VZ which is associated with the data reading device 1, 2 or 3 and stored in the attempt count storage means 35. This will be described in detail hereinafter with reference to the flow chart 31 shown in FIG. 3.

Figure 3:
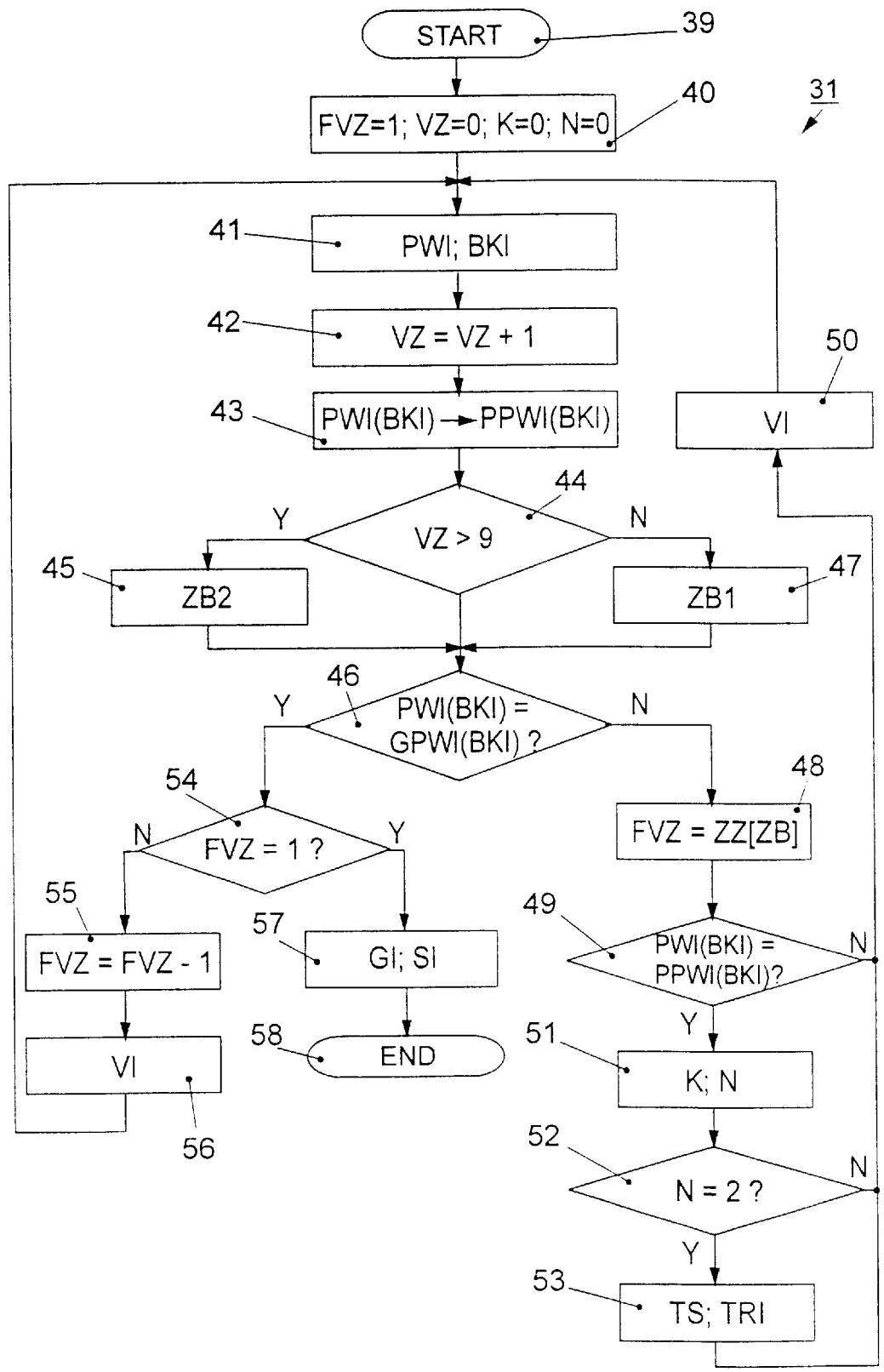
FIG. 3 shows, in the form of a flow chart, a program run which can be executed in control means of the test means shown in FIG. 2.

The test means 27 are arranged to define the random number range ZB1 or ZB2 of the random number generator 34 in dependence on the stored attempt count VZ as will be described in detail hereinafter with reference to the flow chart 31 shown in FIG. 3.

The test means 27 also include tampering detection means 36 for detecting a systematic tampering attempt by a user of a data reading device 1, 2 or 3 in order to extract key information SI stored in the data storage means 28 of the film dispensing device 6. To this end the tampering detection means 36 include repeat means 37 which are arranged to detect an N-times repeated testing by the test means 27 of password information PWI(BKI) applied to the film dispensing device 6 at least K times in succession by a data reading device 1, 2 or 3. K corresponds to the largest value of a random number ZZ that can be selected from the random number range ZB1 or ZB2 by the random number generator 34.

The repeat means 37 are also arranged to store each tested password information item PWI(BKI) as protocoled password information PPWI(BKI) in order to determine, on the basis of the sequence of password information PKI(BKI) entered by a user, whether the user undertakes a tampering attempt as will be described in detail hereinafter with reference to the flow chart 31 shown in FIG. 3.

The test means 27 also include time measuring means 38 which are connected to the control means 30 and serve to measure an inhibit time TS. The test means 27 are arranged to abstain from outputting key information SI, stored in the data storage means 28, during an inhibit time TS after the detection of a tampering attempt by the tampering detection means 36. When a tampering attempt has been detected, the time measuring means 38 can supply the control means 30 with remaining time information TRI which characterizes the time of the inhibit time TS remaining after a tampering attempt, and the control means can apply this information to the data reading devices 1, 2 and 3 as will be described in detail hereinafter with reference to the flow chart 31 shown in FIG. 3.

The program run which is shown as a flow chart 31 in FIG. 3 and is executed by the control means 30 of the test means 27 will be described in detail hereinafter on the basis of an example. For this example it is assumed that the son of an authorized user inserts the smart card 12, whose processing means 13 store user identification information BKI="77", into the set top box 7. It is also assumed that the son of the authorized user would like to view a film which is output at that time as an encrypted television signal VFS by the film dispensing device 6 and that he does not know the correct password information PWI(77)="VIDEO" issued to his father when he purchased the smart card 12. Upon purchase of the smart card 12 the correct password information PWI(77)="VIDEO" was stored as stored password information GPWI(77)="VIDEO" in the password information storage means 32 of the film dispensing device 6, thus releasing the smart card 12 for use.

When in the assumed example the son enters password information PWI="FILM", which might be correct in his opinion, by means of the keyboard 10 of the set top box 7, this password information PWI(77)="FILM" is applied to the film dispensing device 6 in association with the user identification information information BKI="77". The processing means 25 of the film dispensing device 6 filter out this password information PWI(77) from the receiving signal ES, received from the cable network 4 by the film dispensing device 6, via the connection 5, and output this information to the test means 27. When a password information PWI(77) in association with the user identification information BKI="77" occurs for the first time after the insertion of the smart card into one of the data reading devices 1, 2 or 3, the program run in the control means 13 commences in a block 39 of the flow chart 31.

In a block 40, succeeding the block 39, the value "1" is stored as the fail count FVZ in the fail count storage means 33. The value "0" is stored as the attempt count VZ in the attempt count storage means 35. The value "0" is stored for the variable K and for the variable N in the repeat means 37.

In a block 41, succeeding the block 40, the password information PWI="FILM" and the user identification information BKI="77", entered by the son of the authorized user, are determined from the password information PWI(BKI) applied to the film dispensing device 6.

In a block 42, succeeding the block 41, the value "0" of the attempt count VZ, stored in the attempt count storage means 35, is incremented by the value "1" and the value "1" is stored as the attempt count VZ in the attempt count storage means 35. The value of the attempt count VZ is then stored in the attempt count storage means 35 in association with the user identification information BKI="77".

In a block 43, succeeding the block 42, the password information PWI(BKI) applied to the film dispensing device 6 is stored in the repeat means 37 as protocoled password information PPWI(PKI).

In a block 44, succeeding the block 43, it is tested whether the value of the attempt count VZ="1", stored in the attempt count storage means 35, is already greater than the value "9". If this were the case, the program run would be continued in a block 45 in which the random number range ZB of the random number generator 34 would be fixed as a second random number range ZB2. In a second random number range ZB2, fixed in the random number generator 34, a random number ZZ can be selected from the values "3", "4" or "5" as will be described in detail hereinafter. After the execution of the block 45, the program run would then continue in a block 46 of the flow chart 31.

However, because the test in the block 44 reveals that the stored value of the attempt count VZ="1" is not greater than the value "9", the program run is continued in a block 47. In the block 47 the random number range ZB of the random number generator 34 is fixed as a first random number range ZB 1 in which a random number ZZ can be selected from the values "2" or "3" as will be described in detail hereinafter. Subsequently, the program run is continued in the block 46.

In the block 46 it is checked whether the password information PWI(77)="FILM", entered by the son of the authorized user, matches the password information GPWI (77)="VIDEO" stored in the password information storage means 32 of the smart card 12. Because the test by means of the test means 27 in the block 46 reveals that incorrect password information PWI (77) has been entered, the program run is continued in the block 48 of the flow chart 31.

In the block 48, for example the value "2" is determined as the random number ZZ from the first random number range ZB 1 by the random number generator 34 and is stored as the fail count FVZ in the fail count storage means 33. Subsequently, the flow chart 31 is continued in the block 49.

In the block 49 it is checked whether the password information PWI(77)="FILM", last entered by the user, has already been entered once immediately before that and stored as protocoled password information PPWI(77); a protocoled password information PPWI(77) last stored during the block 43 is then ignored. Because the test in the block 49 reveals that the last password information PWI(77)= "FILM" entered has not been entered immediately before that, the program run is continued in a block 50.

In the block 50 the control means 30 output denial information VI via the test connection 26; this information is output, via the processing means 25 of the film dispensing device 6, to the cable network 4, after which it is received by the set top box 7 characterized by the user identification information BKI="77", and displayed on the display screen of the television set 8 in the form of the text information "ACCESS DENIED". Subsequently, the program run is continued in the block 41.

Via the text information "ACCESS DENIED" the son of the authorized user is notified that the password information PWI="FILM" he entered possibly was not correct. In the present example it is assumed that the son of the authorized user then enters the password information PWI="ACCESS" by means of the keyboard 10 of the set top box 7. Subsequently, the block 41 is executed again and in the block 42 the value of the attempt count VZ="2" is stored in the attempt count storage means 35.

After the execution of the blocks 43, 44 and 47, the test executed in the block 46 reveals that the password information PWI="ACCESS" now entered does not match the stored password information GPWI(77)="VIDEO" of the smart card 12, with the result that the program run is continued in the block 48. In the block 48, for example the value "3" then selected from the first random number range ZB 1 by the random number generator 34 is stored as the fail count FVZ in the fail count storage means 33.

In the subsequent block 49 it is tested, as described above, whether the password information PWI(77)="ACCESS" has already been entered once immediately before; however, this is not the case, so that the program run is continued in the block 50. In the block 50 denial information VI in the form of the text information "ACCESS DENIED" is again displayed on the display screen of the television set 8.

It is also assumed that upon purchasing a smart card, every authorized user is informed that, for reasons of security, the user may possibly have to enter the correct password information PWI a number of times after having erroneously entered incorrect password information PWI. It is also assumed that the son of the authorized user has received this information from his father; this is why he again enters the presumably correct password information PWI="ACCESS" by means of the keyboard 10 of the set top box 7.

Subsequently, the previously executed blocks 41, 42, 43, 44, 47, 46 and 48 are executed again; it is established in the block 49 by checking stored protocoled password information PWI(77), that the password information PWI= "ACCESS" has been entered for the second time, with the result that the program run is continued in a block 51.

In the block 51 for the variable K the value "2" is stored in the repeat means 37, because the password information PWI="ACCESS" has already been entered for the second time. Subsequently, the program run is continued in a block 52.

In the block 52 it is tested whether the value of the variable N already corresponds to the value "2". A positive test result in the block 52 would mean that a tampering attempt has been detected, because N="2" times password information PWI has been entered at least K=MAX[ZB1]=3 times in succession. In that case the program run would have been continued in a block 53.

However, because the test in the block 52 reveals that the value of the variable N has not yet reached the value "2", the program run is continued in the block 50 of the flow chart 31 and the text information "ACCESS DENIED" is again displayed on the display screen of the television set 8.

It is also assumed that the son of the authorized user enters the in his opinion possibly correct password information PWI="ACCESS" a third time by means of the keyboard 10, after which it is established in the block 49, after the execution of the blocks 41, 42, 43, 44, 47, 46 and 48, that the same password information PWI(77)="ACCESS", already being stored as protocoled password information PWI(77), has again been entered. Subsequently, in the block 51 the value of the variable K is incremented and K="3" is obtained; the value of the variable K then corresponds to the largest value of a random number ZZ that can be selected from the random number range ZB 1, with the result that for the variable N the value "1" is stored in the repeat means 37. Subsequently, after the execution of the block 52, in the block 50 the text information "ACCESS DENIED" is again displayed on the display screen of the television set 8.

It is also assumed that the son of the authorized user also enters an in his opinion possibly correct password information PWI="BAND" three times in succession by means of the keyboard 10. Subsequently, after the first entry of the password information PWI="BAND" the blocks 41, 42, 43, 44, 47, 46, 48, 49 and 50 are executed, and after each further entry of the password information PWI="BAND" the blocks 41, 42, 43, 44, 47, 46, 48, 49, 51, 52 and 50 are executed; after the third test of the password information PWI= "BAND" in the block 42 the value "7" is stored as the attempt count VZ and in the block 48 the random number "2" is stored as the fail count FVZ. Furthermore, during the third test of the password information PWI="BAND" it is detected, in the block 51, that the value of the variable K again already corresponds to the largest value of a random number ZZ that can be selected from the random number range ZB 1. In response thereto the variable N is incremented by "1" and for the variable N the value "2" is stored in the repeat means 37.

In the block 52, succeeding the block 51, it is detected that the value of the variable N already equals the value N="2"; a systematic tampering attempt by a user of the data reading device 1, by way of the user identification information BKI="77", has thus been detected, after which the program run is continued in the block 53.

In the block 53 the time measurement of the inhibit time TS by means of the time measuring means 38 commences. The inhibit time TS is then defined as a period of two hours after the detection of a tampering attempt. The time measuring means 38 also apply remaining time information TRI to the control means 30 which in their turn apply this information, via the processing means 25 of the film dispensing device 6, to the data reading device 1 which is characterized by the user identification information BKI= "77". The remaining time information TRI is displayed on the television set 8, together with the denial information VI applied to the data reading device 1 during the block 50 which succeeds the block 53. As a result, the television set 8 displays the text information "ACCESS DENIED" as well as the text information "TAMPERING ATTEMPT DETECTED—REMAINING INHIBIT TIME: 2 HOURS". During the inhibit time TS, the test means 27 do not check any further password information PWI from the smart card 12 with the user identification information BKI="77"; therefore, further tampering attempts by a user who is not authorized to use the smart card 12 are advantageously prevented until the inhibit time TS has elapsed. For the present example it is assumed that the son of the user then removes the smart card 12 from the set top box 7.

Because of the presence of the random number generator 34, a user of the data reading device 1 will not know how often password information PWI must be entered so as to find out whether the entered password information PWI is correct or false. Attempted tampering by a user who is not authorized to use a data carrier device is thus significantly impeded.

Because of the presence of the attempt count storage means 35, storing the value of the attempt count VZ which represents the number of entries of password information PWI, and because of the fixation of the random number range ZB (in the blocks 44, 45 and 47 of the flow chart 31) of the random number generator 34 in dependence on the value of the attempt count VZ stored in the attempt count storage means 35, the following advantages are achieved. When the authorized user makes a mistake once while entering password information PWI, the correct password information PWI has to be entered only a limited number of times in succession in order to gain entry or access. However, when an unauthorized user enters password information PWI a larger number of times in order to detect the correct password information PWI, possibly detected correct password information PWI must be entered a larger number of times, selected from the second random number range ZB2, so that attempted tampering is significantly impeded.

The presence of the tampering detection means 36 offers the advantage that systematic entry of different password information items PWI is detected and that the appropriate steps, such as the introduction of an inhibit time TS, can be initiated. Depending on the construction of the data carrier device, for example a data reading device used to make a tampering attempt could be completely inhibited or a supervisor could be warned so as to investigate the user utilizing the data reading device.

According to the present example it is also assumed that the authorized user inserts the smart card 12 into the set top box 7 again 1.5 hours after the detection of the attempted tampering by the tampering detection means 36 of the smart card 12. Subsequently, the denial information VI, output by the control means 30, and the remaining time information TRI are displayed on the display screen of the television set 8 in the form of text information "TAMPERING ATTEMPT DETECTED—REMAINING INHIBIT TIME:0.5 HOURS". The authorized user of a smart card is thus advantageously informed that a non-authorized user has attempted to tamper with his smart card, and also how much time has elapsed since said tampering attempt.

After expiration of the inhibit time TS, amounting to two hours, the authorized user can enter the correct password information PWI="VIDEO" (only known to himself) by way of the keyboard 10 of the set top box 7. Subsequently, after execution of the block 41, the value "7" of the attempt count VZ, indicating the 7-fold entry of incorrect password information PWI by the son of the authorized user, is incremented by the value "1" in the block 42 and the value "8" is stored as the attempt count VZ in the attempt count storage means 35.

After the execution of the blocks 43, 44 and 47, the test in the block 46 establishes that the entered password information PWI(77)="VIDEO" matches the password information GPWI(77)="VIDEO" stored in the password information storage means 32, with the result that the program run is continued in a block 54.

In the block 54 it is tested whether the last value stored as the fail count FVZ equals the value "1". It is then determined that the last value stored in the fail count storage means 33 as the fail count FVZ is the value "2", so that the program run is continued in a block 55.

In the block 55 the value of the fail count VZ is decremented by the value "1" and the program run is subsequently continued in a block 56.

Like in the block 50, in the block 56 denial information VI is output to the cable network 4 by the control means 30 of the test means 27, via the processing means 25 of the film dispensing device 6; this denial information is displayed on the display screen of the television set 8 as text information "ACCESS DENIED". The program run is subsequently continued in the block 41.

Because upon purchasing of the smart card 12 the authorized user has been informed that the correct password information PWI may possibly have to be entered several times after attempted tampering, the authorized user then enters the password information PWI="VIDEO" again by means of the keyboard 10 of the set top box 7. Subsequently, after the execution of the block 41, in the block 42 the value "9" is stored in the attempt count storage means 35 as the attempt count VZ. After the execution of the blocks 43, 44 and 47, the test in the block 46 establishes that the tested password information items PWI(77) and GPWI(77) match, with the result that the program run is continued in the block 54.

During the test in the block 54 it is determined that the value of the stored attempt count FVZ equals the value "1", with the result that program run is continued in a block 57.

In the block 57 the control means 30 apply, via the processing means 25 of the film dispersing device 6, approval information GI to the cable network 4. This approval information GI can be displayed on the display screen of the television set 8 for a brief period of time, by the data reading device 1 characterized by the user identification information BKI="77", as text information "ACCESS GRANTED". Furthermore, in the block 57 key information SI, stored in the data storage means 28, is read from the data storage means 28 by the test means 27 so as to be output to the cable network 4, via the processing means 25 of the film dispensing device 6.

The processing means 9 of the set top box 7 are then arranged to output the received key information SI to the processing means 13 of the smart card 12 in order to decrypt the encrypted film key information stored in the processing means 13. Subsequently, the processing means 13 of the smart card 12 output film key information FSI in order to decrypt the encrypted television signal VFS output by the transmitter means 24, after which the authorized user of the data reading device 1 is enabled to view the film, output by the film dispensing device 6 as an encrypted television signal VFS, on the television set 8. The execution of the flow chart 31 is terminated in a block 58 which succeeds the block 57.

It is thus advantageously achieved that, even after attempted tampering, the authorized user can view the desired film after only a few repeated entries of the correct password information PWI.

Figure 4:
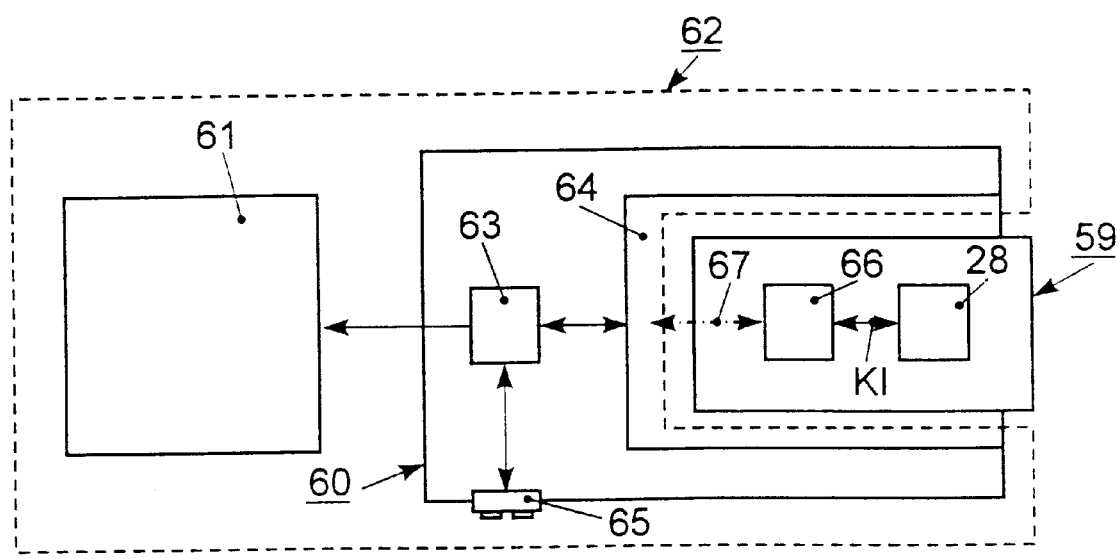
FIG. 4 shows a health care card in the form of a smart card which constitutes a data carrier device wherefrom user data, stored in storage means of the health care card, can be output to a card reading device which includes a monitor and constitutes a data reading device.

FIG. 4 shows a second embodiment of a data carrier device according to the invention which is in this case formed by a smart card 51. The smart card 51 can be inserted into a card reading device 60 which is connected to a monitor 61 and constitutes a data reading device 62 in conjunction therewith.

The smart card 59 includes data storage means 28 in which health care information KI concerning the holder of the smart card 59 is stored, which data may be of interest to a physician or a health care service. Such a smart card 59, also known as a health care card, is issued to each subscriber to a health care service, for example in order to provide an attending physician quickly with information concerning, for example the blood group of the holder of the smart card 59 in the case of an accident. To this end, the smart card 59 can be inserted into the card reading device 60 and the information KI stored in the data storage means 28 can be read from the data storage means 28 by means of the card reading device 60 in order to be displayed on the monitor 61.

In order to prevent unauthorized reading of confidential information KI stored in the data storage means 28, each holder of such a smart card 59 is issued password information PWI when such a smart card 59 is issued. Entering the password information PWI issued to the holder of the smart card 59 enables the reading of confidential information KI, stored in the data storage means 28 of the smart card 59, by means of any card reading device and the display on a monitor connected to such a card reading device.

Furthermore, for example physicians are issued password information PWI(BKI) via which they can read information KI of all smart cards inserted into their card reading device 60 which is characterized by user identification information BKI.

User identification information BKI of the card reading device 60 is stored in processing means 63 of the card reading device 60. The card reading device 60 is connected to a smart card reading device 64 of the card reading device 60. The card reading device 60 also includes a keyboard 65 which is connected to the processing means 63 and can output password information PWI, entered by a user of the data reading device 62, to the processing means 63.

The smart card 59 also includes test means 66 whose construction corresponds to that of the test means 27 shown in FIG. 2 and whose operation corresponds essentially to the operation of the test means 27 as described with reference to the flow chart 31 of FIG. 3. The only difference to be noted between the operation of the test means 27 and that of the test means 66 is that in the block 46 shown in FIG. 3 the test means 66 test whether password information PWI, entered by the user of the smart card 59, matches password information GPWI stored in the password information storage means 32 as well as whether password information PWI (BKI) entered by a physician matches password information GPWI(BKI) stored in the password information storage means 32. When matching of the tested password information PWI and GPWI or PWI(BKI) and GPWI(BKI) is detected, the program run is continued in the block 54 as indicated in FIG. 3.

The test means 66 are constructed (in a manner not shown in FIG. 4) to communicate, via an operative connection 67, with the smart card reading device 64. The smart card reading device 64 is arranged to output information read from the data storage means 28 to the processing means 63 which in their turn can output this information to the monitor 61.

The second embodiment of the invention as shown in FIG. 4 concerns a smart card 59 in which the test means 66 test whether a user is authorized to access confidential information KI stored in the data storage means 28. When the tampering detection means 36 detect an attempt by non-authorized users of the data reading device 62 in order to access stored information KI, appropriate steps can be taken so as to prevent this and further tampering attempts. The confidential information KI stored in the data storage means 28 of the smart card 59 is thus particularly effectively protected against tampering.

It is to be noted that a data carrier device according to the invention may also be included in a computer, together with a data reading device. Test means of the data carrier device according to the invention then serve to test password information PWI entered by a user after the switching on of the computer and, in case the entered password information PWI matches password information GPWI stored in the computer, to grant the user the use of the computer and the reading of data stored on a hard disk of the computer. Processing of user identification information BKI can be dispensed with in this embodiment of the invention It is to be noted that it is alternatively possible to define more than only two random number ranges ZB in dependence on the attempt count VZ, and to allow these random number ranges ZB to include values which are much larger than those in the first embodiment of the invention.

It is to be noted that a data carrier device according to the invention is very well capable of dealing with attempted tampering by means of a so-called automatic hacker device in which a large number of different password information items PWI is automatically applied to a data carrier device a number of times in succession in order to detect the correct password information PWI.

It is also to be noted that a user of the data reading device according to the first embodiment of the invention, after having correctly entered the correct password information PWI subsequent to a detected tampering attempt, may be requested to change the password information PWI. In this case the data carrier device can also change the user identification information BKI automatically, without additional information to the user, in the processing means of the smart card as well as in the password information storage means. These two steps additionally enhance the security for data stored in data storage means of a data carrier device.

It is also to be noted that a data carrier device according to the invention may also be formed by a data server connected to the Internet and a data reading device by a computer connected to the Internet.

It is also to be noted that a smart card that can be inserted into a data reading device may also store the correct password information and that, after insertion of the smart card into the data reading device, the password information can be automatically output to a data carrier device.

It is also to be noted that password information issued to a user of a smart card upon purchase of the smart card, as illustrated on the basis of the first embodiment of the invention, can also be changed by the user after the purchase; in that case the changed password information is stored in the data carrier device as well as in the smart card.

What is claimed is:

1. A data carrier device for outputting data stored in the data carrier device to at least one data reading device, which data carrier device includes data storage means for storing data and fail count storage means for storing a fail count, password information storage means for storing at least one password information item, and test means for testing whether password information output to the data carrier device by a data reading device matches password information stored in the password information storage means, and for changing a fail count, stored in the fail count storage means, in dependence on the test result, the data carrier device being capable of outputting data stored in the data storage means to at least one data reading device if, in case the tested password information matches, the fail count stored in the fail count storage means equals an access value, characterized in that there is provided a random number generator for selecting a random number from a random number range, and that the test means are arranged to fix a selected random number as the fail count, in the case of mismatching of the tested password information.

2. A data carrier device as claimed in claim 1, characterized in that there are provided attempt count storage means for storing an attempt count, that the test means are arranged to change, upon each test of password information output to the data carrier device by a data reading device, an attempt count which is to be associated with the data reading device and stored in the attempt count storage means, and that the test means are arranged to fix the random number range of the random number generator in dependence on the stored attempt count.

3. A data carrier device as claimed in claim 1, characterized in that there are provided tampering detection means for detecting a systematic tampering attempt by a user of a data reading device in order to extract data stored in the data storage means of the data carrier device, the tampering detection means being arranged to detect an N-times repeated testing by the test means of password information which is applied to the data carrier device at least K times in succession by a data reading device, K corresponding to the largest value of a random number that can be selected from the random number range by the random number generator.

4. A data carrier device as claimed in claim 3, characterized in that there are provided time measuring means for measuring an inhibit time, and that during the inhibit time, after the detection of a tampering attempt by the tampering detection means, the data carrier device cannot output any data stored in the data storage means.

5. A data carrier device as claimed in claim 4, characterized in that remaining time information which characterizes the inhibit time remaining after a tampering attempt can be output to a data reading device.

6. A data carrier device as claimed in claim 3, characterized in that in the password information storage means there can be stored, in association with password information, at least user identification information which characterizes a data reading device, and that the test means are arranged to test, upon reception of user identification information and password information, whether the received information matches information stored in association in the password information storage means.

7. A data carrier device as claimed in claim 1, characterized in that the data carrier device is formed by a smart card.

8. A data carrier device as claimed in claim 1, characterized in that the data carrier device is formed by a computer connected to a data network.

* * * * *